United States Patent [19]

Schwärzler

[11] 3,865,043

[45] Feb. 11, 1975

[54] DEVICE FOR DETECTING AND CONTROLLING THE SPACING BETWEEN TWO JUXTAPOSED BODIES

[75] Inventor: Peter Schwärzler, Furstenfeldbruck, Germany

[73] Assignee: Krauss-Maffei Aktiengesellschaft, Munich, Germany

[22] Filed: Oct. 4, 1972

[21] Appl. No.: 297,035

[30] Foreign Application Priority Data
Nov. 25, 1971 Germany............................ 2158387

[52] U.S. Cl.......................... 104/148 MS, 340/38 L
[51] Int. Cl............................................. B61b 13/08
[58] Field of Search... 104/148 MS; 324/34 D, 34 PS; 340/38 L, 258 C; 308/10

[56] References Cited
UNITED STATES PATENTS

| | | | |
|---|---|---|---|
| 2,064,994 | 12/1936 | Stirlen et al..................... | 340/258 C |
| 3,215,901 | 11/1965 | Carniol................................. | 308/10 |
| 3,492,637 | 1/1970 | Switzer............................. | 340/38 L |

FOREIGN PATENTS OR APPLICATIONS

| | | | |
|---|---|---|---|
| 707,032 | 6/1941 | Germany..................... | 104/148 MS |
| 643,316 | 4/1937 | Germany..................... | 104/148 MS |

OTHER PUBLICATIONS

IBM Technical Disclosure Bulletin, Donner, Position Detector, Vol. 6, No. 5, October 1963, p. 24.

*Primary Examiner*—Lloyd L. King
*Assistant Examiner*—Reinhard J. Eisenzopf
*Attorney, Agent, or Firm*—Karl F. Ross; Herbert Dubno

[57] ABSTRACT

A device for detecting and controlling the spacing between two juxtaposed bodies, e.g. a magnetically suspended vehicle and a support track therefor, comprises a parallel-resonant network having a coil bridged by a capacitor and juxtaposed with a conductive plate of one of the members, the detector being provided on the other. A fixed-frequency oscillator, advantageously operating at the resonant frequency of the network, energizes the latter through an ohmic resistor while a voltage detector is connected across the parallel-resonant network between the latter and the resistor. The output of the detector can be used to control either the suspension-gap spacing or a lateral-guide gap spacing of the vehicle.

8 Claims, 3 Drawing Figures

DEVICE FOR DETECTING AND CONTROLLING THE SPACING BETWEEN TWO JUXTAPOSED BODIES

FIELD OF THE INVENTION

The present invention relates to a device for the contactless detection, measurement and control of a spacing or gap between two juxtaposed bodies; more particularly the invention relates to control arrangements for suspended and guided high-speed vehicles in which a gap or clearance is maintained between the vehicle and a support track therefor.

BACKGROUND OF THE INVENTION

With increasing interest in high-speed transportation systems for interurban, intraurban and rural movement of individuals and freight, there have been growing efforts to develop low-friction vehicles with a minimum of contact with the support or track.

Among the more effective systems of this type are magnetically suspended or magnetically guided vehicles in which the vehicle carries one or more electromagnets which are juxtaposed with a ferromagnetic rail, bar or strip serving as an armature and juxtaposed with the electromagnet across a gap. The electromagnets may be provided symmetrically on opposite sides of a vertical median plane of the vehicle in the direction of travel and may be used solely to suspend the vehicle from the track, solely to guide the vehicle laterally (i.e., to resist lateral forces developed during vehicle travel), or both to support the vehicle and laterally guide it.

In such vehicles it is advantageous to determine the gap or spacing between the juxtaposed bodies so that the current traversing the suspension or guide electromagnets can be varied to re-establish a predetermined or optimum gap width. While gap-width detectors have other applications apart from the control of the gap width in a suspended vehicle of the type described, and the system of the present invention is equally applicable, it has been found that the system is most desirable for a suspended vehicle and, when provided upon a suspended vehicle or a vehicle for contactless lateral guidance, has some significant advantages over prior-art devices.

For example, it is known to provide inductive distance sensors on such vehicles and elsewhere, but it has been discovered that high-speed vehicles, provided with support and/or guide rails and using electromagnetic suspension or guidance and/or brush-type electrical pickup from conductors along the track, are unsatisfactory because of the stray magnetic fields which often are of greater magnitude than the variability of the field of the induction coil with variation in spacing. Other systems either involve direct contact between the bodies, with increased friction and problems of wear of the sensor, or are contactless systems which are also influenced adversely by the environment in which the vehicle operates and/or by characteristics of the vehicle operation.

OBJECTS OF THE INVENTION

It is, therefore, the principal object of the present invention to provide an improved device adapted to detect the spacing between two juxtaposed bodies whereby the aforementioned disadvantages will be obviated.

It is another object of the invention to provide a device for the purposes described which is especially suitable for use in high-speed vehicles of the suspended type.

Another object of the invention is to provide a gap-spacing detector of relatively low-cost and simple construction which provides an accurate and error-free indication of the spacing between the two juxtaposed bodies.

Still another object of the invention is to provide an improved suspended vehicle with automatic gap-adjusting means.

SUMMARY OF THE INVENTION

These objects and others which will become apparent hereinafter are attained, in accordance with the present invention, in a device for the contactless detection of the spacing between two juxtaposed members, the device comprising a resonant network on one of these members including an inductor or coil confronting an electrically conductive portion of the other member and having magnetic-field characteristics influenced by the conductive portion. A constant-frequency oscillator is connected in circuit with a resonant network and output-circuit means is also connected to the resonant network to respond to electrical parameters thereof for producing an output in dependence upon the mutual spacing of the two members.

The term "contactless" as used herein to describe the detector, is intended to mean that no mechanical member physically bridges the gap at the detector device, the sole bridge being a magnetic field.

According to another feature of the invention, the resonant network is a parallel-resonant network having a capacitor connected across the inductor or coil, the device also comprising an ohmic resistance in series between the oscillator and the resonant network. The output circuit means can thus include a voltage detector responsive to the voltage of the network and connected across the latter between the resistance and the parallel-resonant network. The oscillator preferably has an output frequency substantially identical to the natural oscillation frequency of the parallel-resonant network in the absence of the conductive portion which preferably is a conductive plate.

According to yet another feature of the invention, the member carrying the oscillator, detector and parallel-resonant network is a high-speed magnetically-suspended and/or magnetically-guided vehicle while the other member is the track along which the vehicle travels. The plate thus may extend along and be fixed to the track. Where an electromagnetic suspension is provided for the vehicle, the suspension-gap spacing is determined by the detector, the output of which may automatically be applied to the suspension coils through a suitable controller to increase the magnetic-field strength when a decrease in the suspension gap is required. Similarly when lateral gaps are provided, the electormagnetic guide coils are energized in response to a gap output. In the usual case the system will include two or more detectors connected to a common oscillator, e.g. for suspension and lateral control, while the detector may include an integrating network whereby the voltage of the parallel-resonant network is applied to a capacitor through a dial, the capacitor being bridged by a bleed resistor. In this case the capacitor represents the gap spacing.

In other words the invention resides in the use of a coil as a distance sensor, carried by one of the juxtaposed members, the coil being part of an electronic oscillating network which is energized by an oscillator of constant frequency. The coil is juxtaposed with an electrically conductive plate of the other body and the measuring means includes a circuit connected to the tuned or resonant network and responsive to the electrical parameters of the network or indicating the spacing. Since the sensor is a simple coil, it can be made as massive as desired or may be protected against environmental effects. On the other hand, even a relatively small coil will suffice so that the mass of the coil need not be excessive. The coil is energized by the alternating current of the oscillator and generates an alternating magnetic field which induces eddy currents in the electrically conductive plate. Magnetic fields produced by the eddy currents, in turn, act upon the coil to alter the operating parameters. The eddy currents have an amplitude which is proportional to the distance between the coil and the plate and hence the feedback effect upon the coil and the damping in the latter is also dependent upon the distance. The presence of the plate shifts the resonance frequency of the resonant network and alters the impedance of this network at a constant energization frequency of the oscillator. When the output of the network is applied to a capacitor, therefore, the voltage detected across this capacitor will be proportional to the spacing.

It has already been noted that a preferred construction provides an ohmic resistor in series with the resonant network which may be of the parallel-resonance type, the detector circuit, i.e., the capacitor and any voltage-responsive means connected thereacross, being tied to the junction of the resistor and the parallel-resonant network. The dependency of the output upon the spacing can be increased still further when the oscillator frequency is precisely the same as the natural oscillation frequency of the parallel-resonant network.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
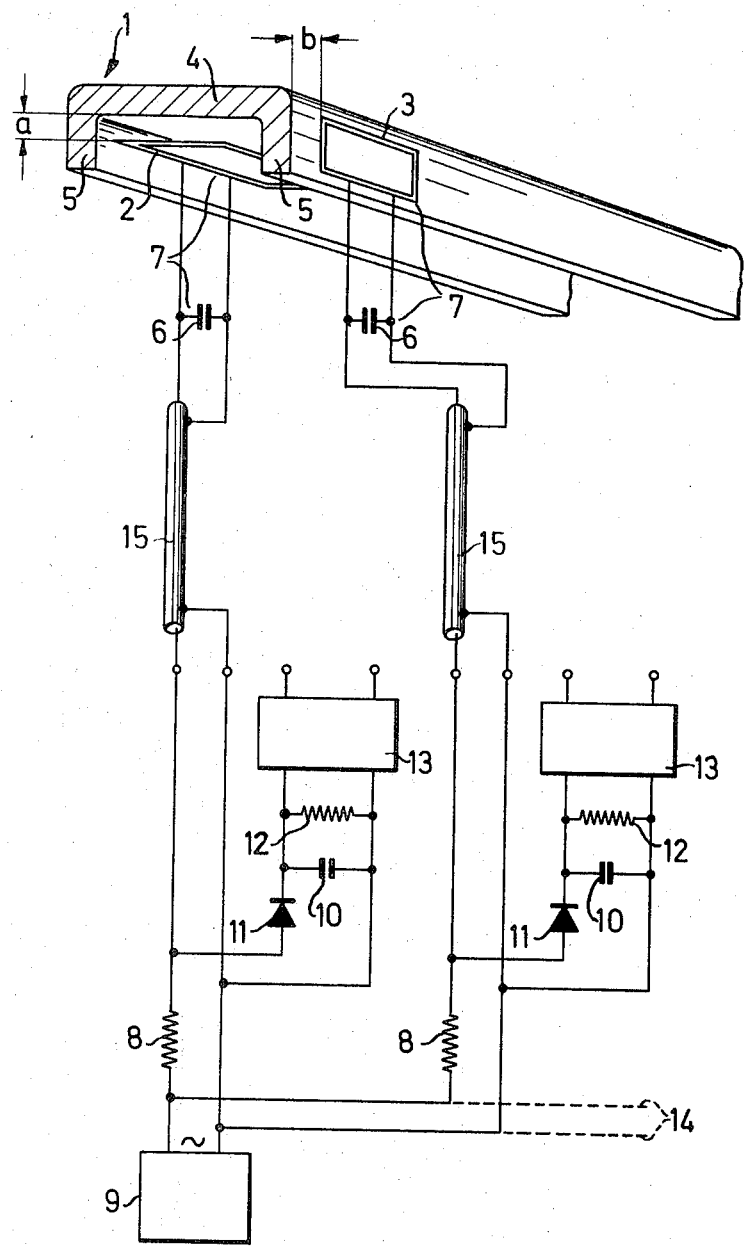
FIG. 1 is a diagram, partly in perspective and partly in block form, of a device for detecting the spacing of two members in accordance with the present invention.
Figure 2:
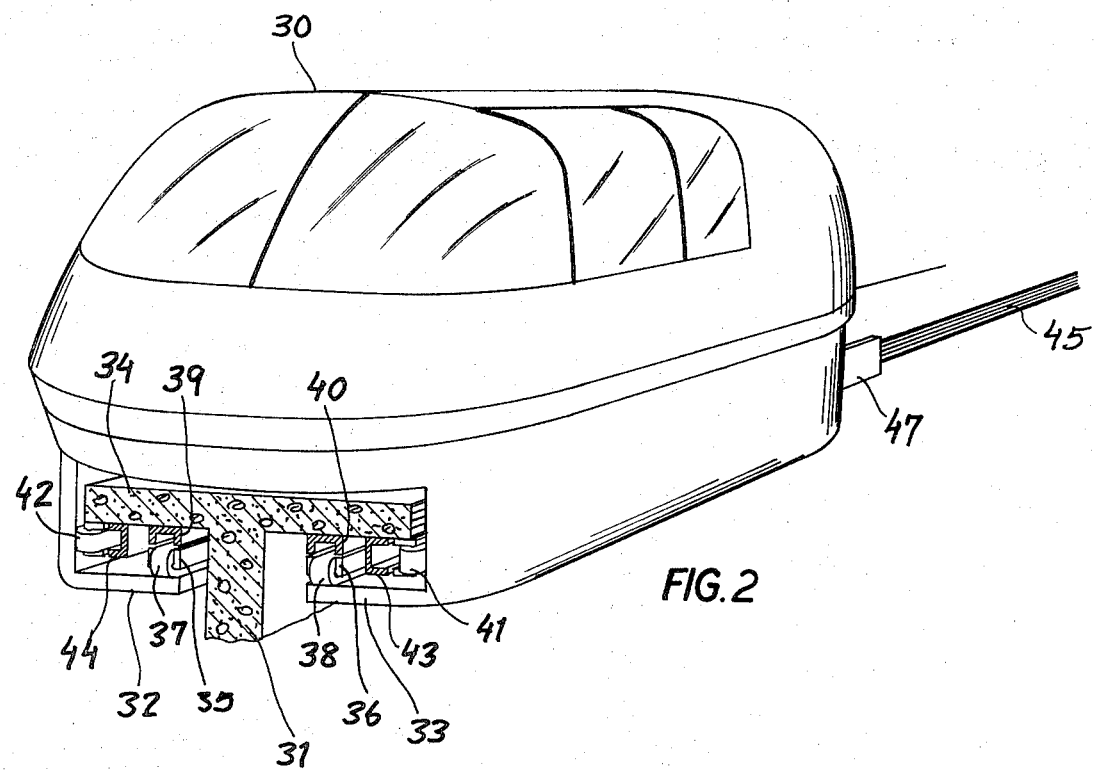
FIG. 2 is a diagrammatic perspective and cross-sectional view illustrating a vehicle system embodying the invention.
Figure 3:
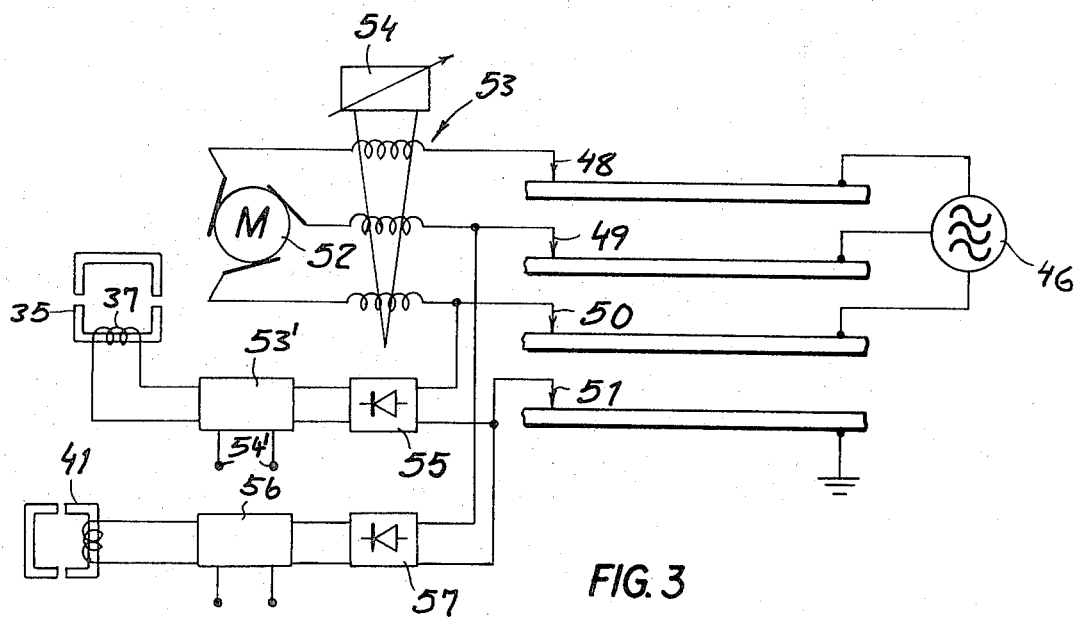
FIG. 3 is a circuit diagram illustrating other principles of the invention in connection with FIG. 2.

Referring first to FIGS. 2 and 3, it can be seen that the system of the present invention may apply to a vehicle 30 adapted to travel along a T-section track 31 and driven by any conventional means, preferably low-friction means such as a linear-induction motor although a contact drive using friction wheels or the like is not excluded. The vehicle 30 is provided with a pair of aprons 32 and 33 underhanging the crossbar 34 of the T and having a pair of upwardly open channels 35, 36 forming electromagnetic cores. Coils 37 and 38 are wound about the webs of these cores and can be energized to provide attractive force to support the vehicle off the track 34 at a relatively small gap spacing, e.g. the spacing $a$ represented in FIG. 1. To this end, the electromagnets 35, 37 and 36, 38 are juxtaposed with downwardly open U-section channels 39 and 40 mounted on the underside of the crossbar 34 and extending continuously over the entire length of the track. The armatures 39 and 40 are attracted by the electromagnets and the magnetic fields of the latter close through these armatures.

To provide lateral guidance in addition to the electromagnetic suspension, the aprons 32 and 33 may carry laterally open U-section electromagnets 41 and 42 with respective magnetic coils. These electromagnets are juxtaposed with armatures 43 and 44 carried by the crossbar 34. Thus attractive magnetic fields to each side of the vehicle tend to center the latter with respect to the track when the vehicle negotiates curves or may be deflected by wind source. As can be seen also from FIG. 2, the flank of the crossbar 34 carries a plurality of rails 45 which may be energized at some remote location by a three-phase source 46 while brushes 47, not shown in detail, deliver electric current to the control and power circuitry of the vehicle.

In simplified form, the vehicle circuitry may be seen to comprise the brushes 48, 49 and 50 which engage the current-carrying rails, as well as a brush 51 in contact with a ground rail. The brushes 48–50 may drive the motor 52 which powers the vehicle via a control system here diagrammatically represented as a saturable reactor 53 whose control 54 may be varied by the operator of the vehicle.

The suspension electromagnets, one of which is shown at 35, 37 in FIG. 3, are energized through an electronic switch system represented at 53', the terminals 54' of which can be connected to the output terminals of the detector of FIG. 1, the electronic switch being connected between a rectifier 55 and the electromagnet. Similarly, the lateral-guide electromagnets, one of which is represented at 41 may be energized through the electronic switch arrangement 56 from the rectifier 57, the terminals of switch 56 being connected to another output member of the circuit of FIG. 1.

Consequently, when the sensor detects an increase in the suspension gap, e.g. as a result of increased loading of the vehicle, the detector output will operate the electronic switch 53' to increase the current through electromagnet 35, 37 and thereby increase the attractive force to restore the desired gap width. The traverse gap width is controlled similarly.

In FIG. 1 there has been shown an armature rail 1 of U-configuration, the armature rail 1 corresponding to the armature rails 39 and 40, for example, and being juxtaposed with a plurality of electromagnets by which the vehicle is suspended. Since the system, in which the magnetic attractive force is employed, is inherently unstable, the energizing current of the electromagnet must be continuously controlled or modified to maintain the desired gap spacing between the electromagnet cores and the rail 1. The desired spacing is represented at $a$. A similar spacing $b$ is provided between the lateral guide magnets and their armatures which, for convenience in illustration, are shown as the lateral flanks of the armature 1.

The gap spacing is detected by coils 2 and 3, constituting distance sensors. The coil 2 is carried on the vehicle such that it lies parallel to the web 4 of the rail 1 and is spaced by the distance $a$ from this web. Similarly, the coil 3 carried by the vehicle is spaced by the distance $b$ from a metal plate here represented as an arm or shank of the channel 1. The coil 3 likewise lies in a plane parallel to the conductive member with which it is juxtaposed and may consist of a multiplicity of spiral turns which likewise lie in this plane.

Coil 2 is connected in parallel with a capacitor 6 and forms a tuned parallel-resonant network 7 therewith, the network being energized via a resistor 8 by an oscillator 9 whose constant-frequency alternating current coincides with the oscillating frequency of the network 7. In other words, the oscillator frequency, the capacitance of capacitor 6 and the inductance of the inductor 2 are so selected that the oscillator frequency, in the absence of any damping conductor in the vicinity of the coil 2 coincides to the natural frequency or resonance frequency of the network 7.

The magnetic field induced by the alternating current oscillation through the coil 2 induces eddy currents in rail 1 which feed back to the coil and shift the resonance point, i.e., damp the oscillation in the network 7. The damping is manifested in heat loss in the rail which corresponds to the loss at a resistor 8.

The alternation of the oscillations of tuned network 7 and the shift in the resonance point results in a potential difference between the oscillator and the tuned network which is applied via a diode 11 to the storage condenser 10. The voltage U across this capacitor is thus a junction of the alternating current voltage in network 7. To permit the capacitor to follow voltage changes in the tuned network rapidly, a bleed or drain resistance 12 is connected across the storage condenser 10. An electronic switch 13, e.g. in addition to or corresponding to members 53' and 56, can be provided to obtain whatever relationship between the response at the electromagnets for a particular voltage is desirable. For example, if a nonlinear increase of the electromagnetic field or a linear increase in the detected distance is desired, the transfer function of block 13 will have a corresponding conformation. In other words, the response relationship is defined as $U = f(a)$ where $U$ is the output voltage at the condenser 12 and $a$ is the response desired at the electromagnetic coil, the transfer function $f(a)$ being provided by block 13.

A similar circuit is provided for coil 13 and all of the detector circuits may be connected to the common oscillator 9 as represented by broken lines 14. Furthermore, the outputs of members 13 can be monitored at a central location. A simple coaxial conductor 15 may connect the tuned networks 7 with the oscillator 9 and resistor 10 to eliminate noise and other background effects.

I claim:

1. The combination of a vehicle track, a vehicle displaceable along said track, and magnet means suspending said vehicle and guiding same along said track with a gap spacing therebetween, with a contactless device for detecting the spacing and controlling said magnet means, said device comprising:

a first member extending along said track;

a second member on said vehicle juxtaposed with said first member;

a parallel resonant network on one of said members including a capacitor and a coil confronting an electrically conductive portion of the other member and having magnetic characteristics influenced by the proximity of said conductive portion, said capacitor being connected across said coil;

a constant-frequency oscillator connected in circuit with said resonant network;

output-circuit means connected to said resonant network and responsive to an electrical parameter thereof for producing an output in dependence upon the mutual spacing of said members;

control means for operating said magnet means to maintain said gap spacing substantially constant; and an ohmic resistance in series with said oscillator and said parallel-resonant network, said output-circuit means including a voltage detector responsive to the voltage across said network, said output-circuit means being connected across said network between said resistance and the network.

2. The combination defined in claim 1 wherein said oscillator has an output frequency substantially identical to the natural oscillation frequency of said parallel-resonant network in the absence of said conductive portion.

3. The combination defined in claim 2 wherein said conductive portion is a metal plate extending continuously along and fixed to said track.

4. The combination defined in claim 1 wherein said magnet means includes a first electromagnet means suspending said vehicle and a second electromagnet means for laterally guiding said vehicle with respect to said track, said coil responding to a suspension gap, said combination further comprising a second coil, parallel-resonant network and output-circuit means for energization by said oscillator to detect a lateral gap width and control said second electromagnet means and maintain a lateral gap spacing.

5. The combination defined in claim 1 wherein said magnet means includes electromagnet means on said vehicle for maintaining a lateral guide gap with said track, said control means being connected to said output-circuit means for energizing said electromagnet means with a current determined by said output.

6. The combination defined in claim 1 wherein a plurality of coils juxtaposed with respective conductive portions are provided to detect the gap spacing of respective but independent gaps, each of said coils forming a respective tuned network and being connected to respective output-circuit means as defined, all of said parallel-resonant networks being energized in common by said oscillator.

7. The combination defined in claim 6, further comprising respective coaxial cables connecting each of said parallel-resonant networks to said oscillator and to the respective output-circuit means.

8. The combination defined in claim 7 wherein each of said output-circuit means includes a storage condenser connected across the respective parallel-resonant networks in series with a diode, a drain resistor connected across each condenser and a respective electronic switch connected across each condenser.

* * * * *